United States Patent [19]
Cogliano

[11] Patent Number: 5,351,414
[45] Date of Patent: Oct. 4, 1994

[54] WATER DEPTH APPARATUS

[76] Inventor: Joseph A. Cogliano, 351 Sturtons La., Pasadena, Md. 21122

[21] Appl. No.: 954,744

[22] Filed: Sep. 30, 1992

[51] Int. Cl.5 ............................................. G01B 3/00
[52] U.S. Cl. ............................................. 33/719; 441/6
[58] Field of Search ................... 33/713, 719, 720; 73/309, 319; 116/227, 228; 441/6, 11, 21, 28, 29, 133, 136, 20

[56] References Cited

U.S. PATENT DOCUMENTS

| | | | |
|---|---|---|---|
| 1,194,846 | 8/1916 | King | 33/719 |
| 1,658,536 | 2/1928 | Philen | 73/319 |
| 2,819,476 | 1/1958 | Dodge | 441/11 |
| 2,829,437 | 4/1958 | Croft et al. | 33/719 |
| 3,084,354 | 4/1963 | Lunenschloss | 441/11 |
| 3,381,534 | 5/1968 | Ball | 33/719 |
| 3,605,147 | 9/1971 | Shelton | 441/6 |
| 3,760,441 | 9/1973 | Handelman | 441/11 |
| 4,077,076 | 3/1978 | Masters | 33/719 |

FOREIGN PATENT DOCUMENTS

| | | | |
|---|---|---|---|
| 0557571 | 8/1923 | France | 33/719 |
| 0254437 | 2/1988 | German Democratic Rep. | 33/713 |
| 0219411 | 5/1968 | U.S.S.R. | 441/6 |
| 0659452 | 4/1979 | U.S.S.R. | 441/6 |
| 0020216 | of 1890 | United Kingdom | 33/713 |
| 1200910 | 8/1970 | United Kingdom | 33/719 |

Primary Examiner—Thomas B. Will
Attorney, Agent, or Firm—Howard Troffkin

[57] ABSTRACT

A device suitable to accurately determine water depth. The device comprises a rod having a weighted first end, a fixed float and a movable float.

9 Claims, 3 Drawing Sheets

WATER DEPTH APPARATUS

BACKGROUND

The present invention is directed to a device which can accurately determine water depth to prevent boaters from running their boat aground. The device, described in detail herein below, provides an inexpensive, yet accurate means of determining water depths while boating in shallow water areas.

When directing a boat into coves, over shells or other shallow water areas, it is extremely important that the boater know the depth of the water to prevent the boat from running aground. A common device used by boaters to determine water depth consists of a weight and line having units of length designated by knots or other markers along the line's length. The boater, or an assistant, throws the weight overboard and determines the water depth by visual observation of the line's markings at the water surface. There are several disadvantages to this method. The user must accurately determine the weight's anchoring or placement on the sea bottom and then maneuver the line, without moving the weight, until it is perpendicular to the sea bottom to obtain an accurate reading. To obtain accurate depth readings requires the full attention of the user, taking away the attention he normally would devote to boat operation.

Recently, electronic devices have been developed to measure sea depth. They generally are mounted onto the boat's hull and function by emitting a signal down into the water. These devices measure the time interval between the emission and the reception of a signal after being reflected from the sea bottom. The major disadvantages of such electronic depth measurement devices are the expense of the device and its mounting, inaccuracy due to reflections from schools of fish, etc, and the fact that they generally measure only the depth of the water under the boat's hull and not that of the area forward of or around the boat, which is the information needed to be able to determine the safety of proceeding.

It is the object of the present invention to provide a device which can accurately measure water depths in an easily applied manner. The present device can be used to determine water depth forward of or at positions surrounding the boat to enable the boater to determine a safe route to proceed without running the boat aground.

In addition to the above objects, the subject device can also be used, as described herein below, as a mooring mast to aid a boater in safely snaring and attaching the boat to a mooring buoy. The subject device also can be used as a means to provide a highly visible location device with respect to a person or object who has accidentally fallen overboard. It can be thrown overboard close to the victim and will remain upright and extended above the water surface to allow the boat to be maneuvered back to the location of the overboard individual. The device can also be used to mark an object, such as an anchor, located on the sea floor.

DETAILED DESCRIPTION

Figure 1:
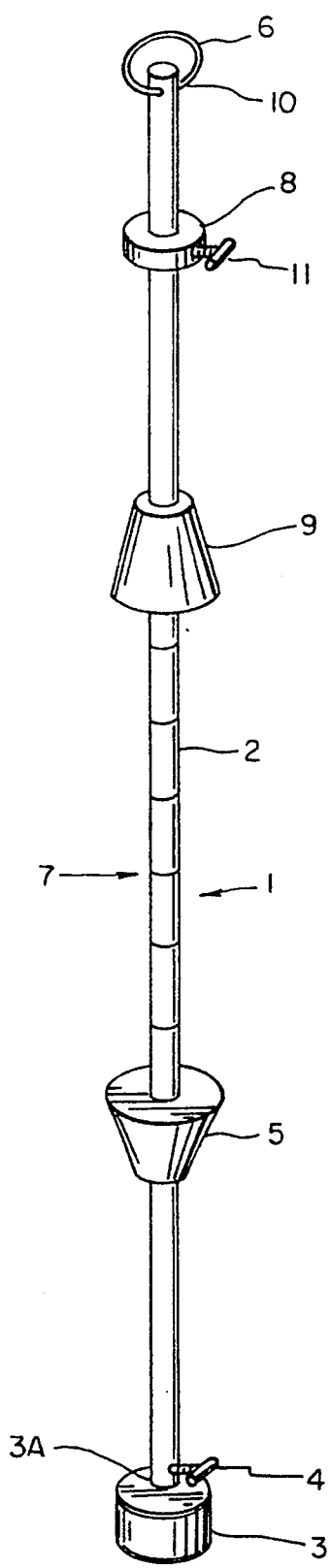
FIG. 1 is a longitudinal view of a subject device of the present invention having a one piece body rod.

The basic device of the present invention is shown in FIG. 1. The device (1) is composed of a rod (2) which is normally cylindrical and of a length greater than the draft of the boat from which application is to be made. The rod has a weight (3) attached to one end (3A) by an attachment means (4), such as a nut and bolt, cotter pin or the like. The rod (2) can be made of any material, preferably a material which is not readily corroded by water, such as aluminum, brass, or various plastics. The exact nature of the rod will depend on desired durability, economics and the like and can be readily determined. The rod can be made of any length but the minimum length should be greater than the draft of the boat for which it is contemplated for use. The maximum length is merely dictated by convenience of storage and handling. The subject device (1) having a fixed length rod can be made in varying length rods to provide the needs of different boaters. At a determined length from the weight (3) along the rod (2), a floatation means (5) is located and affixed to the rod (2). The fixed floatation means (5) is normally affixed to rod (2) at a position which is submerged when the device is in use. The fixed floatation means should have a buoyancy which is less than that to counter the downward force of the weight (3). The fixed floatation means (5) can be made of any material having a density less than water such as fused polystyrene bead, foam rubber, foam plastic, and the like. The fixed floatation means (5) preferably encircles the rod at the predetermined position, can have any desired shape, such as cylindrical, spherical or conical (preferred) and is affixed to rod (2) at the predetermined position by means such as waterproof adhesive (chosen based on material of the rod and floatation means), or mechanical means such as pin, screw or the like or by friction fit.

The counter forces of the weight (3) and the fixed float (5), located along the rod at the position below the potential water line, cause the rod to extend in a substantially vertical position from the sea floor.

The end of rod (2) which is opposite to the weighted end has an attachment means (6), such as a closed ring, to attach a retrieval line. The line (not shown) allows easy retrieval of the device (1), especially when the device is tossed into the water outside of arms' reach.

The length of rod between the fixed floatation means (5) and the attachment means (6) has markings (7) to indicate units of length along the rod and to aid in determining the water depth when the device (1) is in use for this purpose. The markings should be of a color (or colors) which is distinct from that of the rod (2) itself to aid in being readily read from the boat. The markings may also be of a reflective material to aid in night observations.

On the section of rod (2) containing the markings (7) (that section of rod (2) between the fixed floatation means (5) and the rod end (10) having the attachment means (6)) is located a movable stop (8) and a movable float (9). The movable stop (8) is located between the movable float (9) and rod end (10). It can be in the form of a circular member or collar which has an inside diameter slightly larger than the outside diameter of rod (2) to permit easy sliding and positioning of the stop along the graduated marking section of rod (2). The stop (8) has a means (11), such as a wing bolt the like, for fixing stop (8) at a desired position along rod (2). The movable float (9) is formed of a buoyant material having a density of less than that of water (1 gm/cc) which may be selected from the same or a different material than that of fixed float (5). The movable float (9) surrounds and is spaced from rod (2) to permit free movement of float (9) along the graduated length of rod (2). Spacing is normally provided by having the inside diameter of movable float (9) be from 1/16 to ½ inch greater than the outside diameter of the rod (2). The exact shape of float (9) is not critical although it is preferably in a spherical, cylindrical or conical shape. The inside diameter of float (9) can be formed of a sleeve composed of a material such as polyethylene, polypropylene, polyvinyl chloride, chlorinated polyvinyl chloride, nylon or the like, having a low degree of friction with rod (2) to thus enhance the free movement of float (9) along rod (2). The stop (8) can be positioned at any desired position along the graduated portion of rod (2). For example, if positioned close to end (10) of rod (2), it permits free movement of float (9) along the total graduated portion of rod (2). In this manner, when the subject device is placed in the water, the device will automatically position itself so that the weight (3) is on the sea floor; the rod (2) is alligned substantially vertical by the buoyant force of fixed float (5) acting counter to weight (3); and float (9) is allowed to rise to the water surface and position itself along rod (2) adjacent to one of the depth markers (7) so that the depth of the water can be readily determined.

Alternately, the stop can be affixed at a designated length along the rod (2) which is equal to the draft of the boat. When the device is placed in the water, the boater can immediately tell if the water is deeper than the required draft. The float (9) will be in contact with stop (8) and cause the device (1) to float and be free of the sea floor or, at maximum, to just touch the floor.

When stop (8) is affixed on rod (2) at a position so that float (9) is positioned adjacent to float (5), the combined buoyancy forces of floats (9) and (5) are greater than the downward force of weight (3) and the weight of the remainder of the device. Thus, the present device, when in this configuration is useful as a marker and the like. It can be thrown overboard to mark a person or object which has fallen overboard or, alternately, it can be attached to an anchoring buoy to clearly mark the buoy's position because the device will remain in an upright position extending out of the water.

Figure 2:
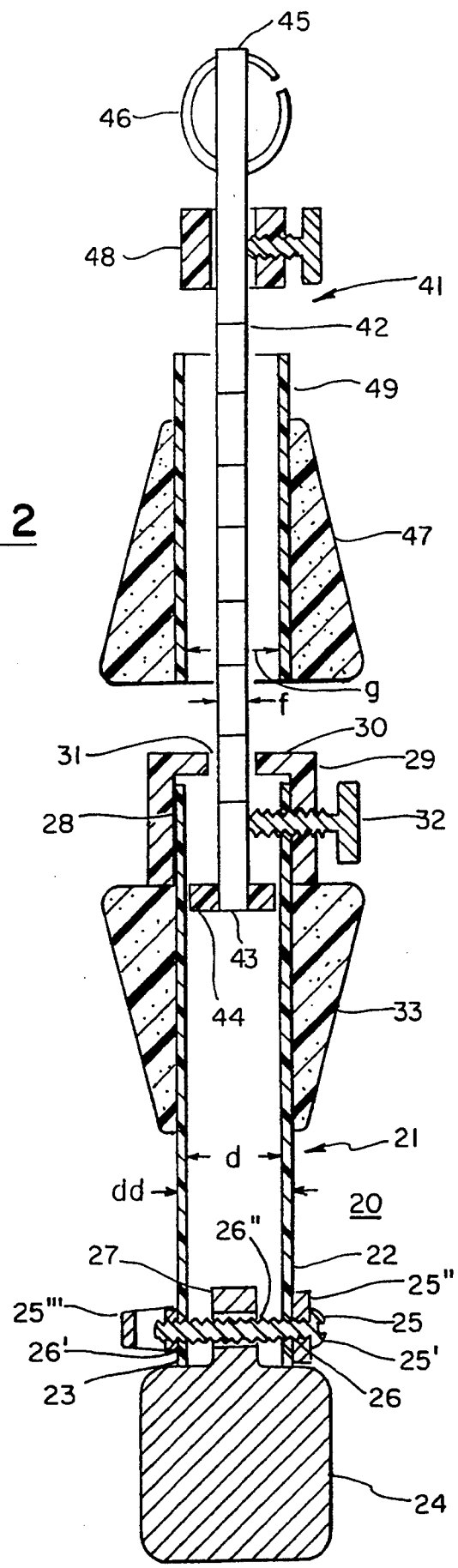
FIG. 2 is a cross-sectional view of a subject device of the present invention having a telescoping body rod.

An alternative embodiment of the subject device is shown in FIG. 2. In this embodiment the device is formed of a rod body composed of a multiple of sections capable of telescoping from one another to provide a rod of the desired length. The device of this embodiment provides the enhanced ability of being reduced in size for easy storage and the like.

The device of FIG. 2 shows a telescoping device composed of two rod sections. Devices with multiple sections can also be made according to the present invention. Device (20) is composed of a first section (21) and a second telescoping section (41). Section (21) is formed of a rod (22) having a first end (23) to which is attached a weight means (24). The rod (22) is in the form of a hollow tube having an inside diameter "d" which is sufficiently great to accommodate the rod section of section (41) as described below. The weight (24) is attached to rod (22) by an attaching means which is depicted as a bolt (25) which passes through holes (26) and (26') spaced from first end (23) and located diametrically opposite to each other with respect to the hollow tube of rod (22). The bolt (25) also passes through hole (26") formed in an appendage (27) of weight (24) which extends into the hollow end of the hollow tube (22). The bolt (25) secures the weight (24) to end (23) by having the bolt shaft through holes (26), (26'), (26") and outside (referring to the exterior of tube 22) of hole (26) is located bolt head (25') and, optionally, a washer (25"). On the outside of hole (26') is a securing means (25"), such as a nut or the like. In lieu of the securing means, one may use a ring structure which provides means from which a line (not shown) can be attached. This line can be used to attach the device to an anchoring buoy or the like at the option of the boater.

The length of hollow tube (22) should be sufficient to house a major portion of tube (41) and the combined extensions of tube (21) and (41) should be greater than the draft of the boat for which one contemplates its use. Hollow tube (22) has an inside diameter "d" and an outside diameter "dd" and the difference between "dd" and "d" is the thickness of the material forming the hollow tube (22). This thickness should be sufficient to give rigidity to hollow tube (22).

The second end (28) of tube (22) is fitted with a collar member (29) which surrounds the outer surface of tube (22) adjacent to second end (28) and extends a short distance down the tube (22). The collar member (29) further extends over end (28) towards the center axis of tube (22). The extending member (30) of collar (29) should provide a guiding orifice (31) which is smaller than the inside diameter "d" of tube (22) and slightly larger than the diameter of the rod member of element (41) described below. The collar further should have a means for holding the rod member of element (41) in a fixed extended position, such as by a threaded wing bolt (32) which can be moved inward/outward along a radius of the tube (22) to hold in position or permit movement of the rod member of element (41). Tube (22) further has a fixed float (33) positioned substantially adjacent to the collar (29). This fixed float, similar to float (5) described above should have a buoyancy capacity sufficient to cause the device to be in a substantially vertical position when used in the water but insufficient to alone counter the downward force of weight (24) to cause the device to float.

Contained within tube (22) and extending outward (away from end (23)) through end (28) via collar opening (31) is slide-able rod element (41). This element (41) is composed of a top rod (42) which may be hollow or solid having a first end (43) which is housed inside of the hollow of tube (22) and has a guiding collar (44) of a diameter slightly less than diameter "d" of tube (22) and greater than the diameter of orifice (31). The diameter "f" of top rod (42) should be substantially equal to/or less than that of orifice (31) to permit easy movement of the tube in and out of the lower rod (22). It is preferred that collar (44) and collar (29) each be formed of a durable, self lubricating material such as high impact polypropylene or the like and be secured to rod (43) and tube (22), respectively such as by threading or adhering each collar onto the respective members.

The second end (45) of top rod (42) may have a ring (46) or other attachment device can be housed. The ring provides a means of attaching a line to the device (21) so it can be readily retrieved after being cast into the water. On the portion of top rod (42) extending outside of tube (22) is a movable float (47) and a movable stop The movable stop (48) can be in the form of a hollow cylinder having a hollow diameter which is slightly larger than diameter "f" of rod (42) and has a means (shown as a wing screw) to fix the stop at desired positions along the extended portion of rod (42). The stop (48) can be used in the same manner as described above for stop (8) of device (1).

The movable float (47), similar to float (9) described above, is formed of a buoyant material and surrounds and is movable along the length of rod (42). It can be of any desired shape (cylindrical, spherical, conical) and should have an inside diameter "g" which is slightly larger than diameter "f". The inside diameter may be formed of a sleeve (49) which is made of a material having a low degree of friction with respect to rod (42). Further, the ends of sleeve (49) may have an inner tip (not shown) to further reduce friction.

Figure 3:
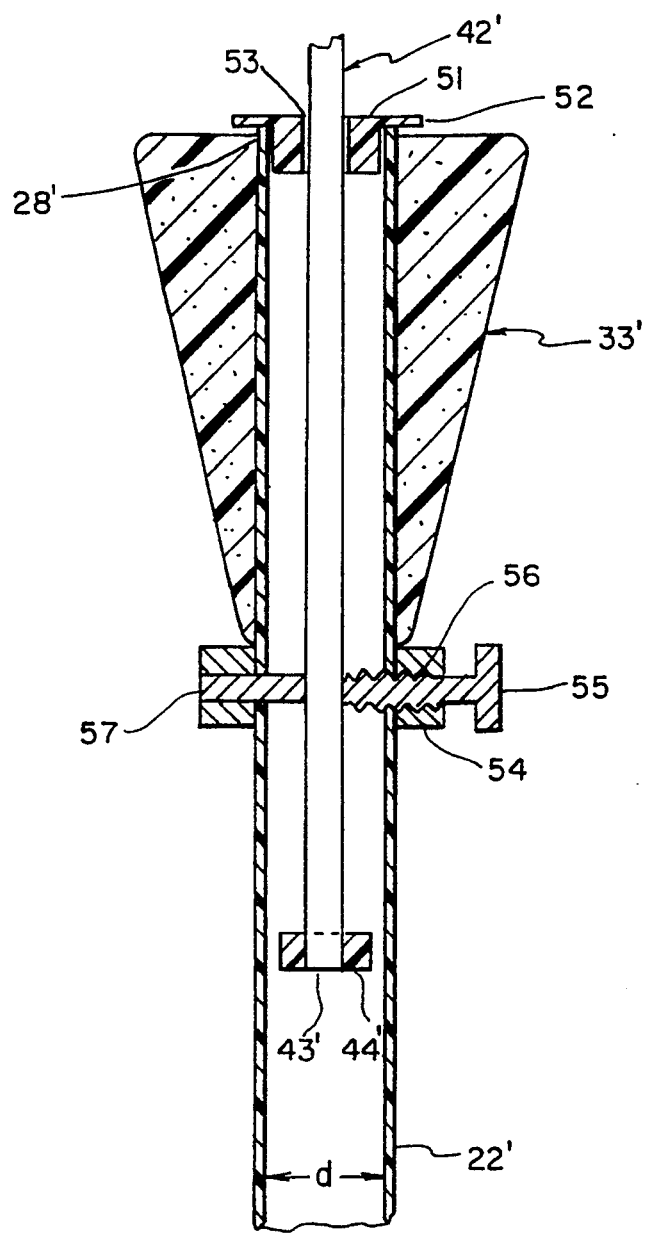
FIG. 3 is a cross-sectional view of a preferred configuration of the rods weighted section.

A preferred configuration for fixed float (33) is shown in FIG. 3. The rod (22') which is the lower section of a telescoping rod, has second end (28') fitted with a bushing (51). The bushing (51) has a flanged end extending outwards over end (28'), a body extending inward into rod (22') with an outer diameter equal to "d", the inner diameter of rod (22'), and has an opening (53) which is slightly larger in diameter than rod section (42') which passes through the bushing. The fixed float (33') is positioned with one end substantially adjacent to the flanges (53) of bushing (51) and its body extends down part of the length of rod (22'). At the other end of fixed float (33') is a collar (54) affixed to and surrounding the rod (22'). The collar has a bolt (55) with the bolt's threaded shaft (56) extending through the collar and radially inward toward the extension of rod (42') contained within the hollow body of rod (22'). On the diametrically opposite side of collar (54) is a rod (57) which extends through the collar and radically inward toward the extension of rod (42'). Rod (57) should have a length to extend almost adjacent to the extension of rod (42), but not to impede its free movement. Rod (57) provides a stop for the end (43') of rod (42') and further acts as a counter member when bolt (55) is threaded inwardly to hold rod (42') in a fixed position. Rod (57) may be threaded and fitted with a bolt head or allen wrench fitting (not shown) to allow removal of this member from the collar and aid in disassembly of the device when desired. The portion of rod (42) housed inside the hollow of rod (22') extends from opening (53) and past elements (56) and (57) and then ends at end (43'). This end (43') has a coller (44') of a diameter slightly less than diameter "d". This collar aids in guiding the tube (42') during movement and acts as a stop when it comes in contact with elements (56) and (57).

The subject device having telescoping members can be collapsed for easy storage and extended to its working length by loosening holding means (32) and extending rod (42) until it reaches the desired length or to its maximum length when collar (44) comes in close proximity to means (32) of collar (29). The device is then used in the same manners and purposes, as described above for device (1).

I claim:

1. A device capable of determining water depth comprising a rod-like body having a first end and a second end; a weight located at the first end of said body; a buoyancy means attached to said body at a fixed and spaced position from the weighted first end and capable of causing the rod-like body to extend substantially vertically when the weighted first end is in contact with terrain submerged under water; a float capable of freely moving along the rod-like body from the fixed buoyancy means towards the second end of the body; the rod-like body having markings at intervals along the body between the fixed buoyancy means and the second end; and a stop affixed to said body between the float and the second end of the body, said stop having an affixing means capable of permitting changes in the position of said stop along the rod-like body and securing the stop to said body at desired positions.

2. The device of claim 1 wherein the buoyancy means has a buoyancy force less than the downward force of the remainder of the device and the buoyancy means and float together have a buoyancy force greater than the downward force of the remainder of the device.

3. The device of claim 1 wherein the second end of the rod-like body further has an attaching means for attaching a tether line to the device.

4. The device of claim 1 wherein the rod-like body is a hollow tube.

5. The device of claim 2 wherein the rod-like body is a hollow tube.

6. The device of claim 3 wherein the rod-like body is a hollow tube.

7. The device of claim 4 wherein the hollow tube body is composed of telescoping sections and means for affixing each section in an extended position with respect to the other sections.

8. The device of claim 5 wherein the hollow tube body is composed of telescoping sections and means for affixing each section in an extended position with respect to the other sections.

9. The device of claim 6 wherein the hollow tube body is composed of telescoping sections and means for affixing each section in an extended position with respect to the other sections.

* * * * *